US007334797B2

(12) United States Patent
Thomas

(10) Patent No.: US 7,334,797 B2
(45) Date of Patent: Feb. 26, 2008

(54) ROCK CYCLE CARD GAME

(76) Inventor: Leanne Thomas, 6258 Oaklawn La., Dale City, VA (US) 22193

( * ) Notice: Subject to any disclaimer, the term of this patent is extended or adjusted under 35 U.S.C. 154(b) by 200 days.

(21) Appl. No.: 11/068,464

(22) Filed: Feb. 28, 2005

(65) Prior Publication Data

US 2006/0192336 A1  Aug. 31, 2006

(51) Int. Cl.
*A63F 1/00* (2006.01)
(52) U.S. Cl. .................. 273/302; 434/299
(58) Field of Classification Search ............ 273/302; 434/276, 299
See application file for complete search history.

(56) References Cited

U.S. PATENT DOCUMENTS

| 506,648 | A | * | 10/1893 | McGeorge et al. | 273/302 |
|---|---|---|---|---|---|
| 1,053,672 | A | * | 2/1913 | Stout | 273/302 |
| 1,139,356 | A | * | 5/1915 | Fields | 273/236 |
| 1,273,024 | A | * | 7/1918 | Branch | 273/302 |
| 1,682,244 | A | * | 8/1928 | Phillips | 273/302 |
| 5,951,013 | A | * | 9/1999 | Campanella | 273/308 |
| 6,267,377 | B1 | * | 7/2001 | Griggs | 273/292 |
| 6,402,152 | B1 | * | 6/2002 | Kutzik | 273/296 |
| 6,435,508 | B1 | * | 8/2002 | Tavel | 273/292 |
| 6,601,851 | B1 | * | 8/2003 | Sakamoto et al. | 273/308 |
| 7,055,823 | B2 | * | 6/2006 | Denkewicz, Jr. | 273/304 |
| 7,144,013 | B2 | * | 12/2006 | Tanaka | 273/308 |

* cited by examiner

*Primary Examiner*—William M. Pierce
(74) *Attorney, Agent, or Firm*—William H. Holt

(57) ABSTRACT

A deck of specially designed cards used to teach the rock cycle though easy to play games. The deck contains cards with the titles of various rock types along with the names and pictures of specific rocks that fit into each type. The cards are color-coded to aid in differentiation between types. The deck also contains cards that indicate the processes by which one rock type is changed into another. Colored squares on these cards that coincide with the color-coded rock cards reinforce the written explanation.

4 Claims, 5 Drawing Sheets

— dark blue
— light blue
— red
— yellow

— tan
— light tan red light red brown light brown

ROCK CYCLE CARD GAME

STATEMENT REGARDING FEDERALLY SPONSORED RESEARCH OR DEVELOPMENT

Not applicable

CROSS REFERENCE TO RELATED APPLICATIONS

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

This invention relates to playing cards used for educational and entertainment purposes. More particularly, it relates to a novel deck of cards and associated games designed for learning the rock cycle.

In the Commonwealth of Virginia, as well as in many other states, public school curriculum requires that children study geology and learn the rock cycle. Traditionally, this learning takes place through books, illustrations, worksheets, and sometimes—even work with actual rock samples. Children are required to memorize the various rock types, to know which specific rocks fit into each category, and how they continually change through natural processes from one form into another.

Children learn fastest and remember more of what they learn when they are actively involved in the learning process. Most notably, this can happen seamlessly and effortlessly through play. Children at play repeatedly practice the concepts presented during play, not realizing that they are learning in the process. This invention provides just such a mechanism for children to learn the rock cycle.

Although card games have been developed to practice a number of other curriculum facts and concepts that children must learn, no card game has been developed specifically for learning the rock cycle.

BRIEF SUMMARY OF THE INVENTION

This invention allows the player to learn the rock cycle through active participation in fun and easy to play card games. While the players' primary focus is to win the game, players unwittingly learn the rock cycle as they play their cards. Cards can only be played according to what happens to rocks in nature. Constant exposure to various rock types and specific examples of each further enhances players' abilities to retain information. Likewise, repetitiveness of play, the requirement to read aloud the processes presented on the cards during play, and using color coded cards which sort the rocks into the various types all aide in learning and remembering rock cycle concepts.

DETAILED DESCRIPTION OF THE INVENTION

Figure 1:
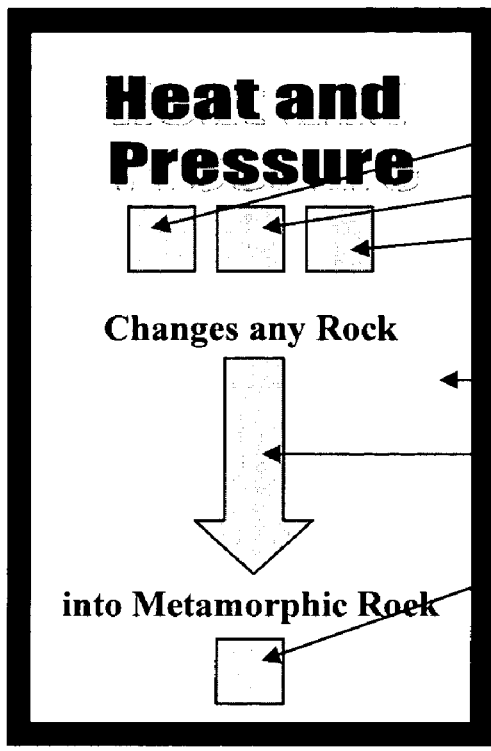
FIG. 1 shows a Heat and Pressure card. Each of these cards is colored the same color, and has colored squares with words to indicate what rock type is changed into what rock type through this process.
Figure 2:
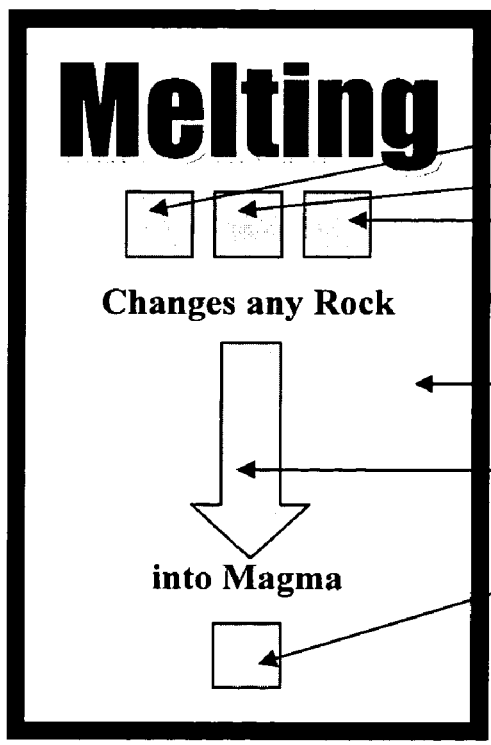
FIG. 2 shows a Melting card. Each of these cards is colored the same color as FIG. 1, and has colored squares with words to indicate what is rock type is changed into what rock type through this process.
Figure 3:
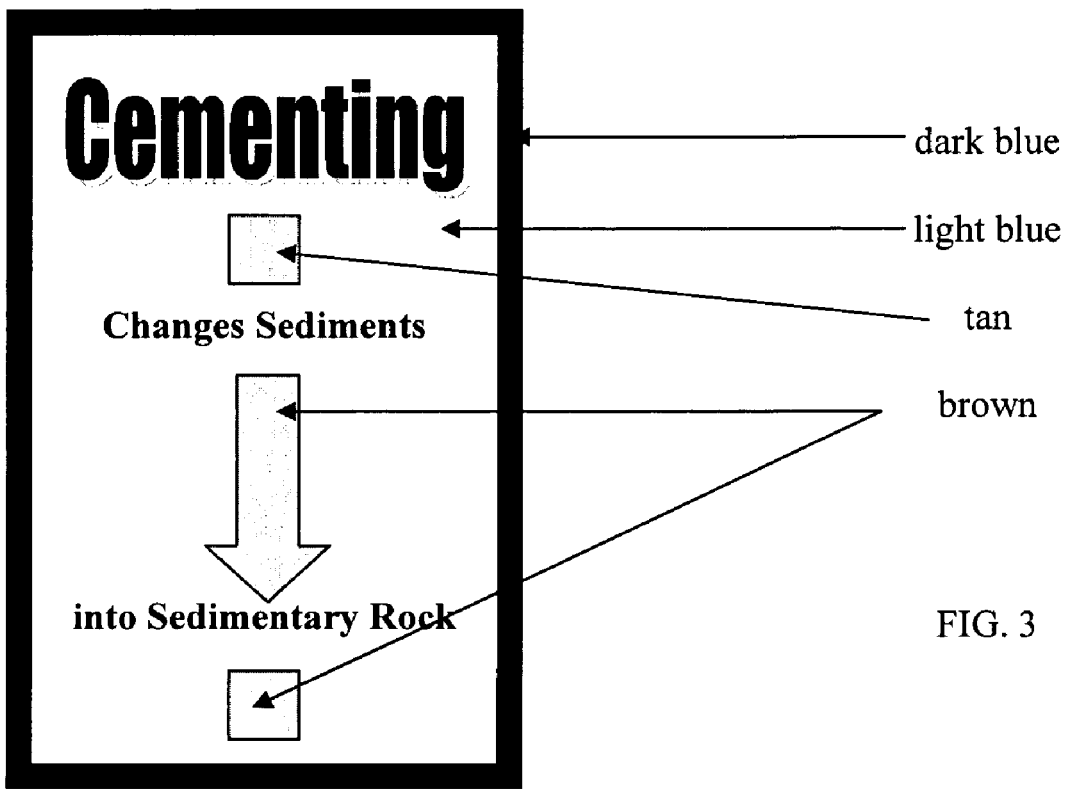
FIG. 3 shows a Cementing card. Each of these cards is colored the same color as FIG. 1, and has colored squares with words to indicate what rock type is changed into what rock type through this process.
Figure 4:
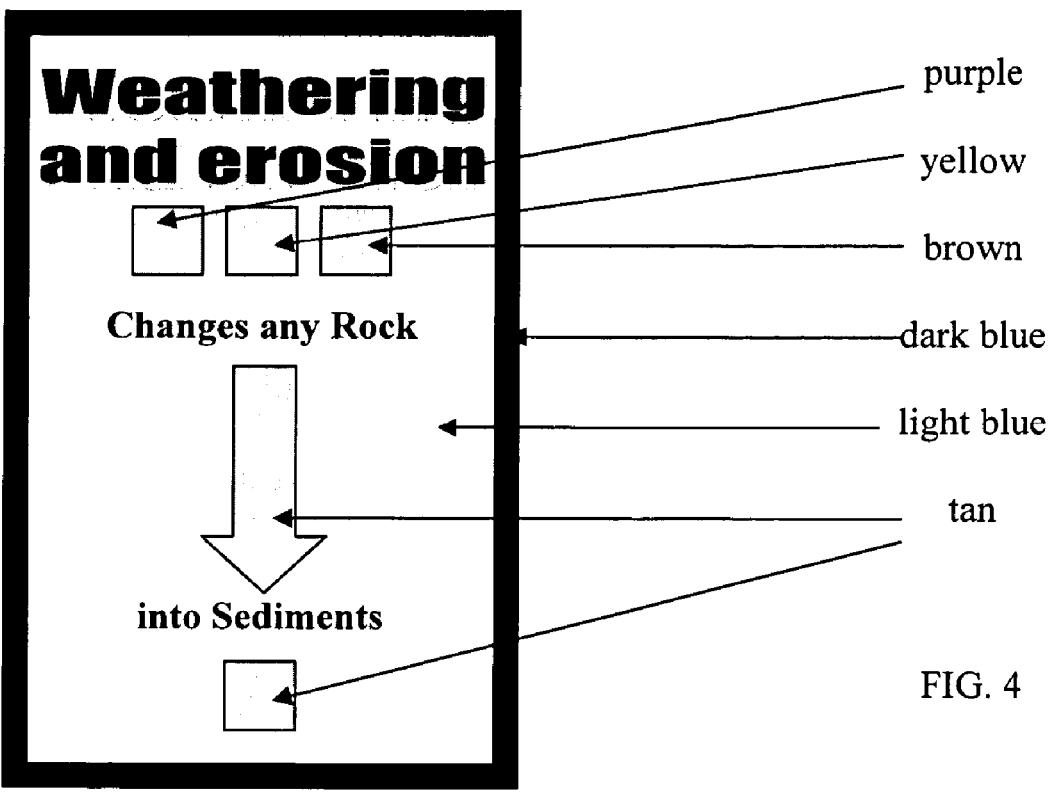
FIG. 4 shows a Weathering and Erosion card. Each of these cards is colored the same color as FIG. 1, and has colored squares with words to indicate what rock type is changed into what rock type through this process.
Figure 5:
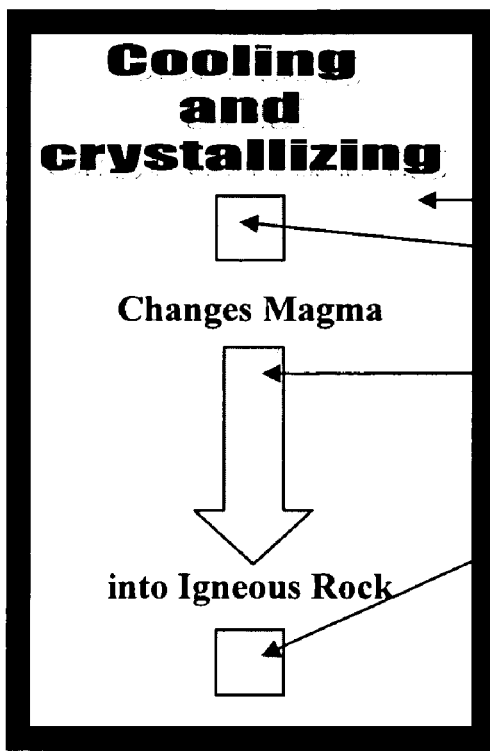
FIG. 5 shows a Cooling and Crystallizing card. Each of these cards is colored the same color as FIG. 1, and has colored squares with words to indicate what rock type is changed into what rock type through this process.

The invention is a deck comprised of 60 cards. Some of the cards (FIGS. 1-5) are designated change cards, each describing one of five processes by which a rock changes from one type into another. These cards are all the same color, so as to distinguish them as change cards. There are 4 each of Heat and Pressure, Melting, Cementing, Weathering and Erosion, and Cooling and Crystallizing cards. Each card depicts the title of the card as well as colored squares with words to indicate what rock type is transformed into what rock type through this process. The colors in the squares correspond to the colors used on the cards for each rock type.

Figure 6:
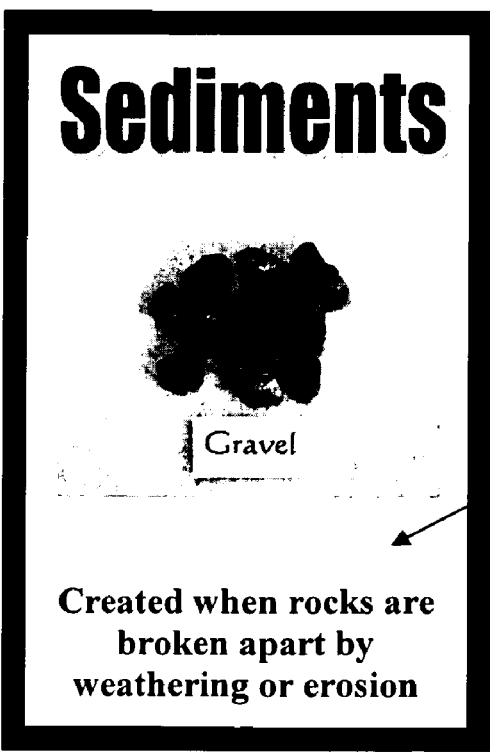
FIG. 6 shows a Sediments card. Each Sediments card is colored the same color, has a description of how this is formed, and has a picture with name of a specific type of sediment.
Figure 7:
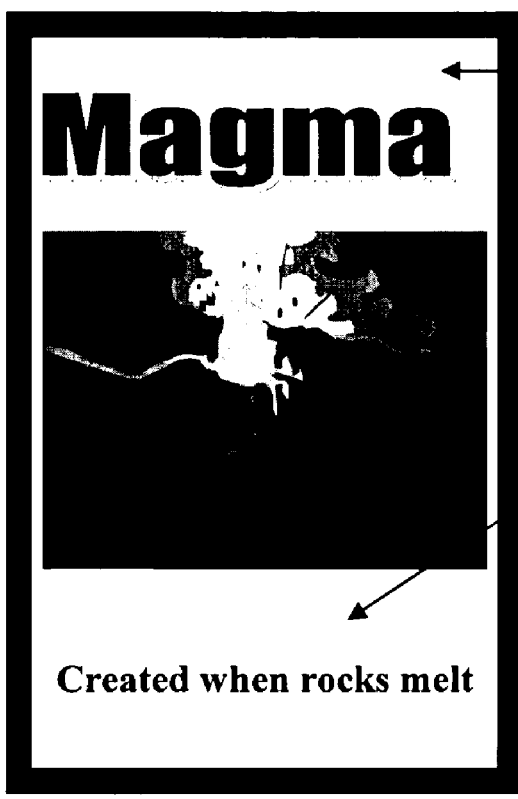
FIG. 7 shows a Magma card. Each Magma card is colored the same color, has a description of how this is formed, and has a picture with name of magma.
Figure 8:
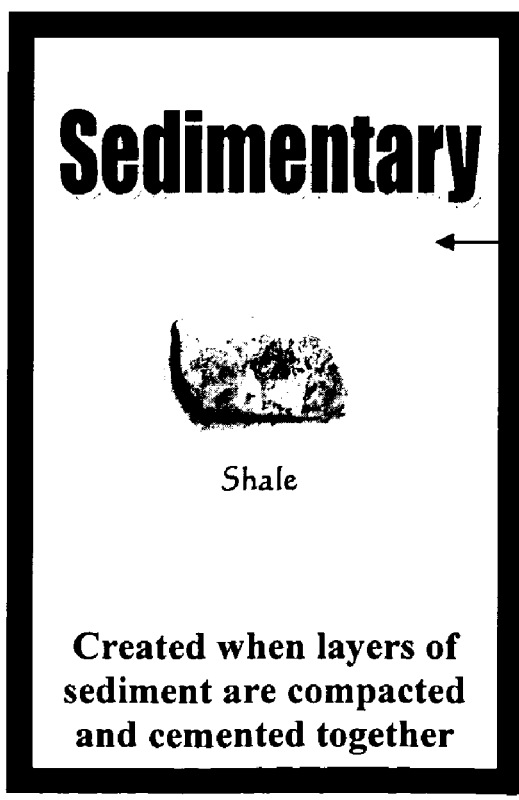
FIG. 8 shows a Sedimentary card. Each Sedimentary card is colored the same color, has a description of how this is formed, and has a picture with name of a specific type of Sedimentary rock.
Figure 9:
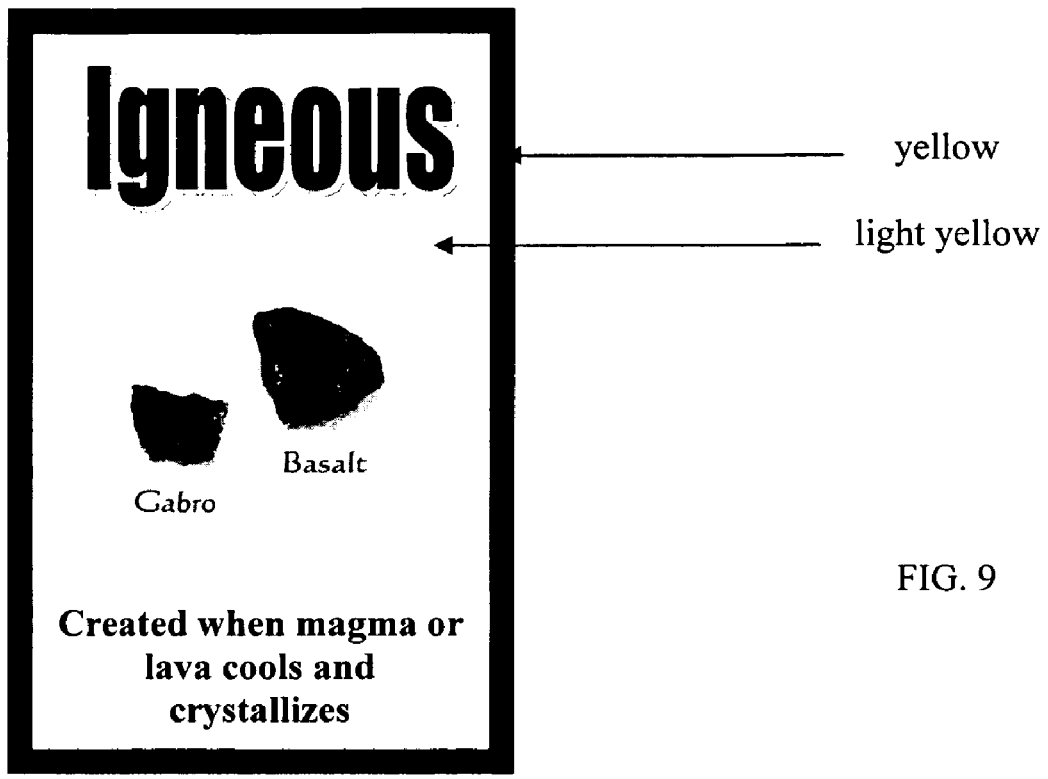
FIG. 9 shows an Igneous card. Each Igneous card is colored the same color, has a description of how this is formed, and has a picture with name of a specific type of Igneous rock.
Figure 10:
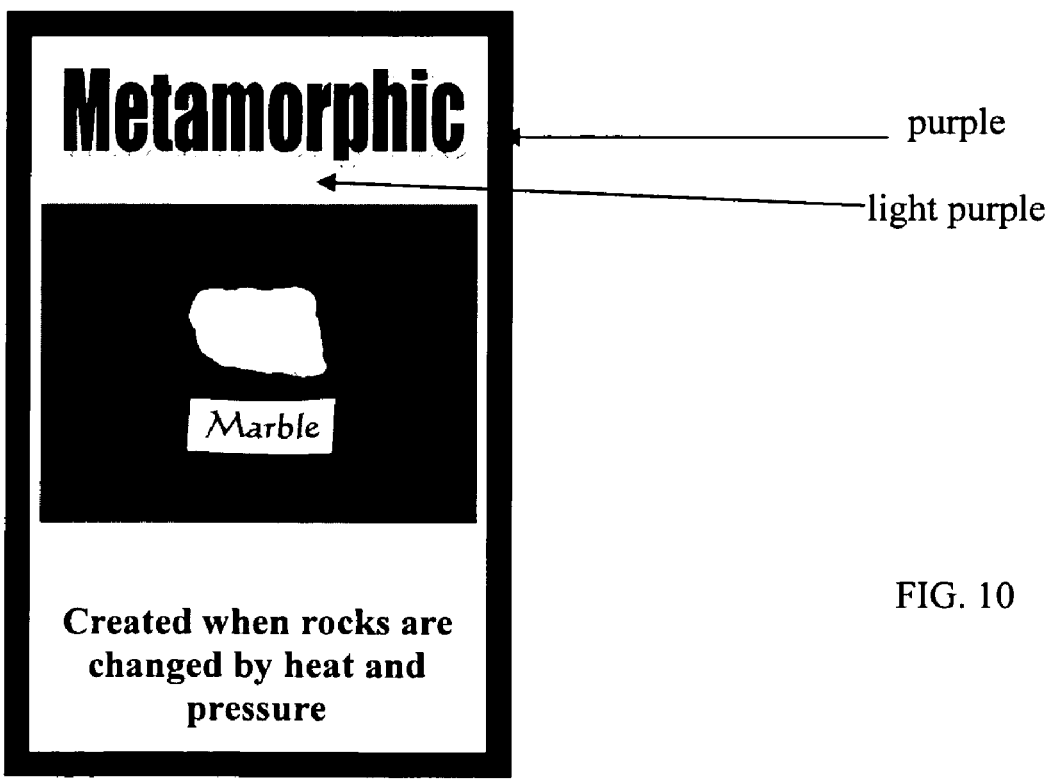
FIG. 10 shows a Metamorphic card. Each Metamorphic card is colored the same color, has a description of how this is formed, and has a picture with name of a specific type of Metamorphic rock.

The rest of the deck is comprised of rock cards; 8 of each type labeled Sediments, Magma, Sedimentary, Igneous, and Metamorphic (FIGS. 6-10). Each type of rock is a different color. Each card is labeled with the rock type, a picture of a specific rock that is categorized as that type, and a written description of how that rock type is formed.

All cards have the same design on the back of the card so as to make one card indistinguishable from another from the back.

Standard play involves the following steps. Seven cards are dealt to each player. The stack is put in the middle, face down, to be used as a draw pile. One card is turned up to form a discard pile. The first player must play the same kind of rock card (Sediment, Magma, Sedimentary, Igneous, or Metamorphic) as is face up, or can change the kind being played with an appropriate change card. For example, Melting can be used after Metamorphic, Igneous, or Sedimentary (since all these rocks can melt into magma), but cannot be used after Sediments or Magma (which both do not melt into magma). The colored squares on each card help the player to play the correct card. If the first card down is a change card, the first player must play a card of the same color as the square at the bottom of the card. As the card is put down, the player reads the card so that all players can hear. For example, if a Melting card is played, the player would say "Melting changes any rock into Magma." If a player does not have a card to play, he/she must pick one from the draw pile. The player may play that card if it is appropriate. If the card cannot be played, the player says "pass" and it is the next player's turn. The other players do the same thing. The first person to put down all of his/her cards wins.

A variation of this game can be played for an easier game. In this variation, a player may put a change card on top of a change card, rather than only being able to play a rock card on top of a change card.

Another variation may also be played. For a greater challenge, players try to get three cards of one kind (Sediment, Magma, Sedimentary, Igneous, or Metamorphic), three cards of a second kind, and a change card that links the two rock types. For example, a player would win with 3 Igneous cards, 3 Metamorphic cards, and 1 Heat and Pressure card. Another example is that a player would win with 3 Sedimentary cards, 3 Magma cards, and 1 Melting card. In this game, seven cards are dealt to each player. The stack is put in the middle face down to form a draw pile. One card is turned up to form the discard pile. The first player draws the top card from the draw pile or the discard pile. He/she then discards one card that is not wanted face up onto the discard pile. If the player has 3 of one kind, 3 of another kind, and the change card that links them, he/she reads the cards as he/she lays them down and is the winner. If not, play goes to the next person. The game is continued in this manner until someone wins. If all of the draw pile is used up before someone wins, the cards are taken from the discard pile and shuffled. (The top card is left so that the players know what needs to be played next). The cards are put face down as the draw pile and play is continued.

The foregoing detailed description of the invention is intended to be illustrative and not intended to limit the scope of the invention. Changes and modifications are possible with respect to the foregoing description, and it is understood that the invention may be practiced otherwise that specifically described herein and still be within the scope of the claims.

What I claim as my invention is:

1. A deck of generally planar playing cards, said deck including a plurality of article cards defining types of articles and a series of process cards, said process cards containing indicia thereon for defining a transition of one of said types of articles into another of said types of articles, wherein said process cards individually contain a description of various physical processes including "heat and pressure", "melting", "cementing", "weathering and erosion" and "cooling and crystallizing" for changing one of said type or articles into another type of said articles.

2. A deck of generally planar playing cards, said deck including a plurality of article cards defining types of articles and a series of process cards, said process cards containing indicia thereon for defining a transition of one of said types of articles into another of said types of articles, wherein said article cards individually depict geological elements of specific types of rocks including sedimentary rocks, igneous rocks and metamorphic rocks, and further depict geological elements of sediment and magma, wherein said process cards individually contain a description of various physical processes including "heat and pressure", "melting", "cementing", "weathering and erosion" and "cooling and crystallizing" for changing one of said type of articles into another type of said articles.

3. A deck of playing cards as defined in claim 2 wherein said process cards are individually color coded in conjunction with individual ones of said article cards for providing visual data corresponding to said description of various physical processes.

4. A deck of playing cards as defined in claim 2 wherein said article cards contain a written explanation as to how each type of rock is formed.

* * * * *